(12) United States Patent
McLean

(10) Patent No.: US 7,665,482 B2
(45) Date of Patent: Feb. 23, 2010

(54) FLOAT CONTROL FLUID SHUT OFF VALVE MECHANISM

(76) Inventor: Kerry McLean, P.O. Box 23, Milford, MI (US) 48381

( * ) Notice: Subject to any disclaimer, the term of this patent is extended or adjusted under 35 U.S.C. 154(b) by 425 days.

(21) Appl. No.: 11/699,861

(22) Filed: Jan. 30, 2007

(65) Prior Publication Data

US 2008/0178945 A1 Jul. 31, 2008

(51) Int. Cl.
F16K 31/18 (2006.01)
(52) U.S. Cl. .......................... 137/420; 137/410; 251/74
(58) Field of Classification Search ................ 137/312, 137/409, 410, 416, 420–422; 251/74; 122/505; 119/80
See application file for complete search history.

(56) References Cited

U.S. PATENT DOCUMENTS

| | | | |
|---|---|---|---|
| 1,028,681 A | | 6/1912 | Creighton et al. |
| 1,179,431 A | * | 4/1916 | Hewitt et al. ................ 137/410 |
| 1,223,584 A | * | 4/1917 | Huebsch et al. ............. 137/410 |
| 1,507,182 A | * | 9/1924 | Hopwood ................... 137/399 |
| 2,724,401 A | * | 11/1955 | Page ......................... 137/403 |
| 2,767,732 A | | 10/1956 | Hodgson et al. |
| 3,473,553 A | | 10/1969 | Collins |
| 3,920,031 A | | 11/1975 | Maxfield |
| 4,805,662 A | * | 2/1989 | Moody ....................... 137/312 |
| 4,909,274 A | | 3/1990 | Rodriguez |
| 5,682,919 A | | 11/1997 | DiMaggio |
| 5,839,466 A | | 11/1998 | Dutter |
| 6,206,337 B1 | * | 3/2001 | Veillet, Jr. .................... 251/74 |
| 6,253,785 B1 | | 7/2001 | Shumake, Jr. et al. |
| 6,336,469 B1 | * | 1/2002 | Nixon et al. .................. 251/74 |
| 6,543,471 B1 | * | 4/2003 | Carroll ....................... 137/312 |
| 6,895,990 B1 | | 5/2005 | Carroll |
| 6,899,122 B1 | * | 5/2005 | Mele .......................... 137/312 |
| 7,424,896 B1 | * | 9/2008 | Martin et al. ............... 137/312 |
| 7,562,673 B1 | * | 7/2009 | Martin et al. ............... 137/312 |

* cited by examiner

*Primary Examiner*—John Rivell
*Assistant Examiner*—Craig Price
(74) *Attorney, Agent, or Firm*—Dykema Gossett PLLC

(57) ABSTRACT

A mechanism for opening or closing a shut off valve, the mechanism having a lever mounted on a spindle to which the valve is attached for mounting the valve from a normally open position to a closed position. A trigger mechanism including the lever and a biasing spring which when activated, rotates the lever, spindle and valve. A retainer mechanism ordinarily holds the trigger mechanism in a cocked position corresponding to the open position of the valve. The float, when subjected to water, releases the retainer mechanism permitting the trigger mechanism to close the valve.

20 Claims, 5 Drawing Sheets

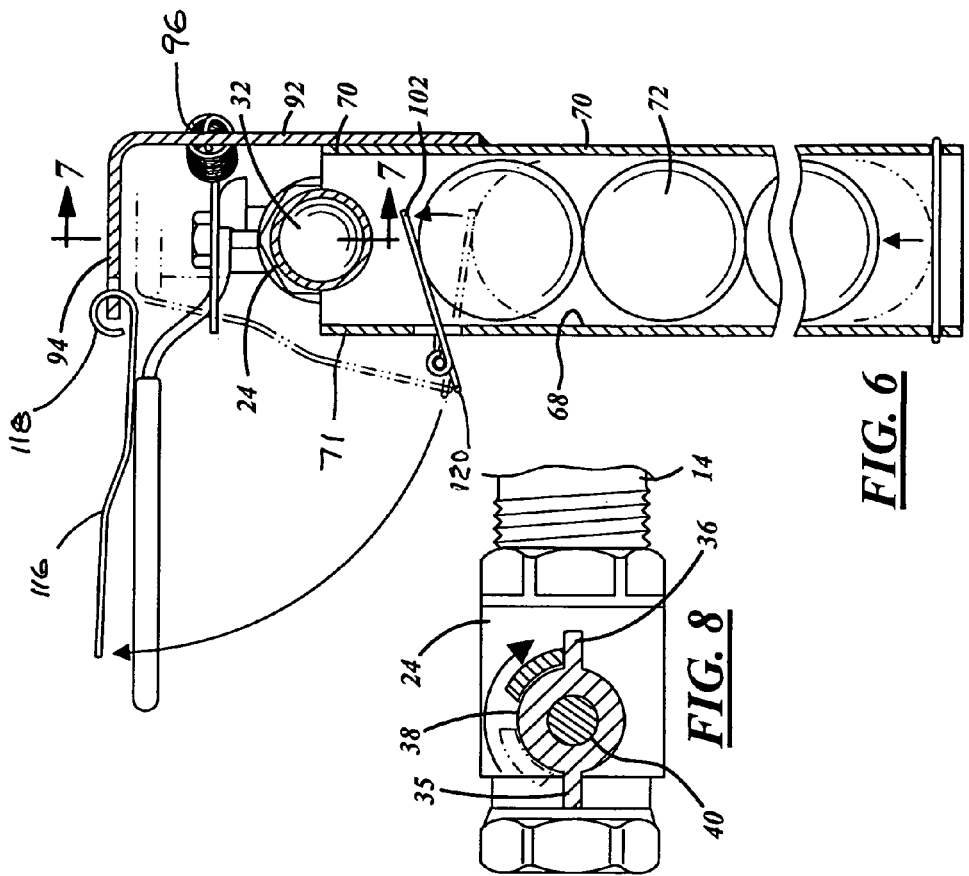
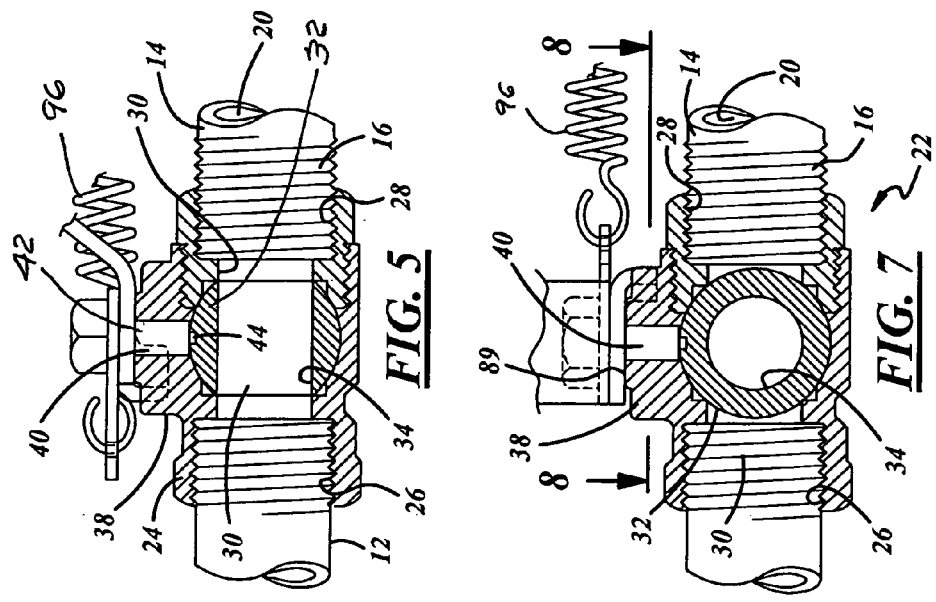
FIG. 6
FIG. 8
FIG. 5
FIG. 7

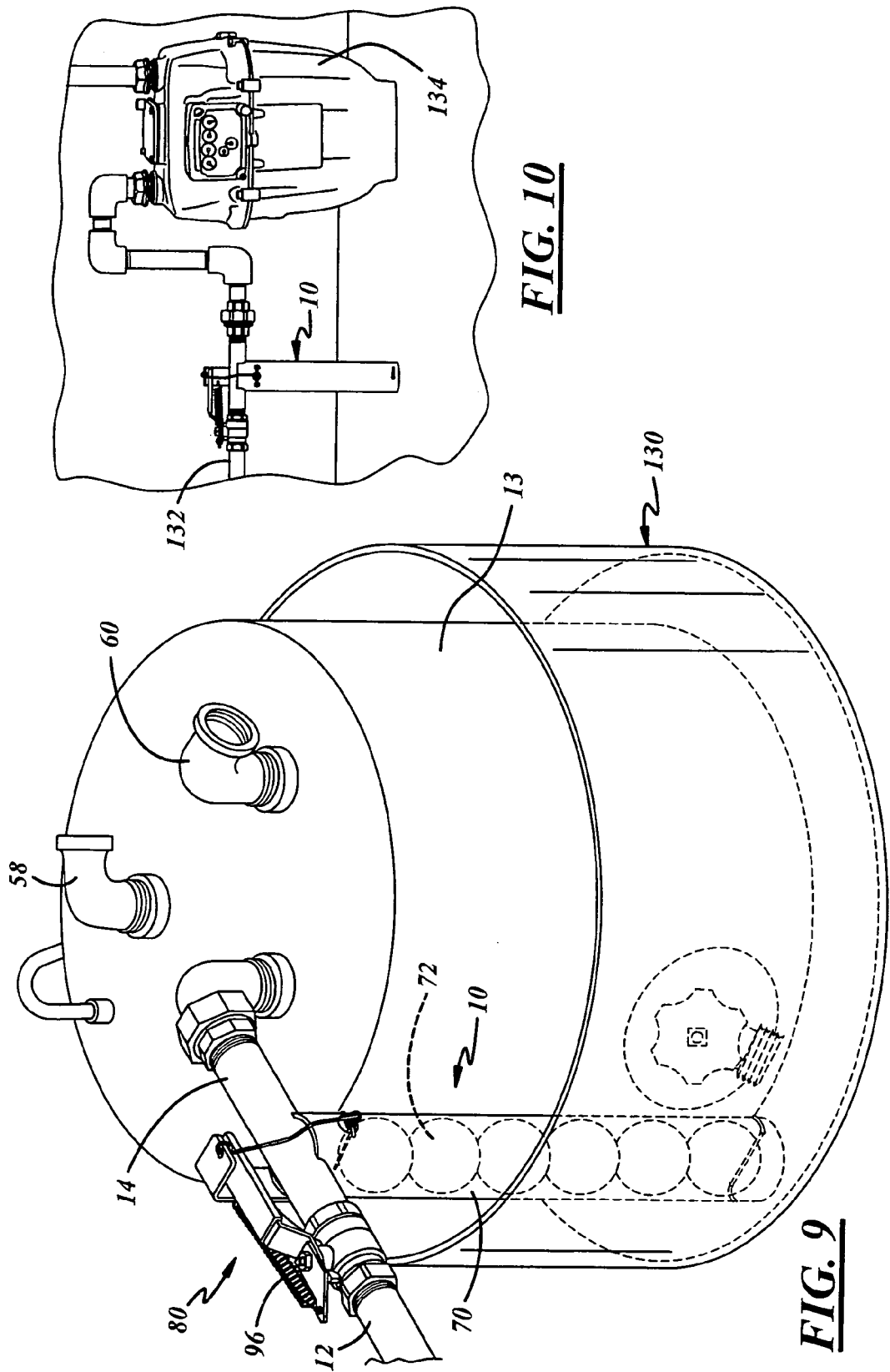

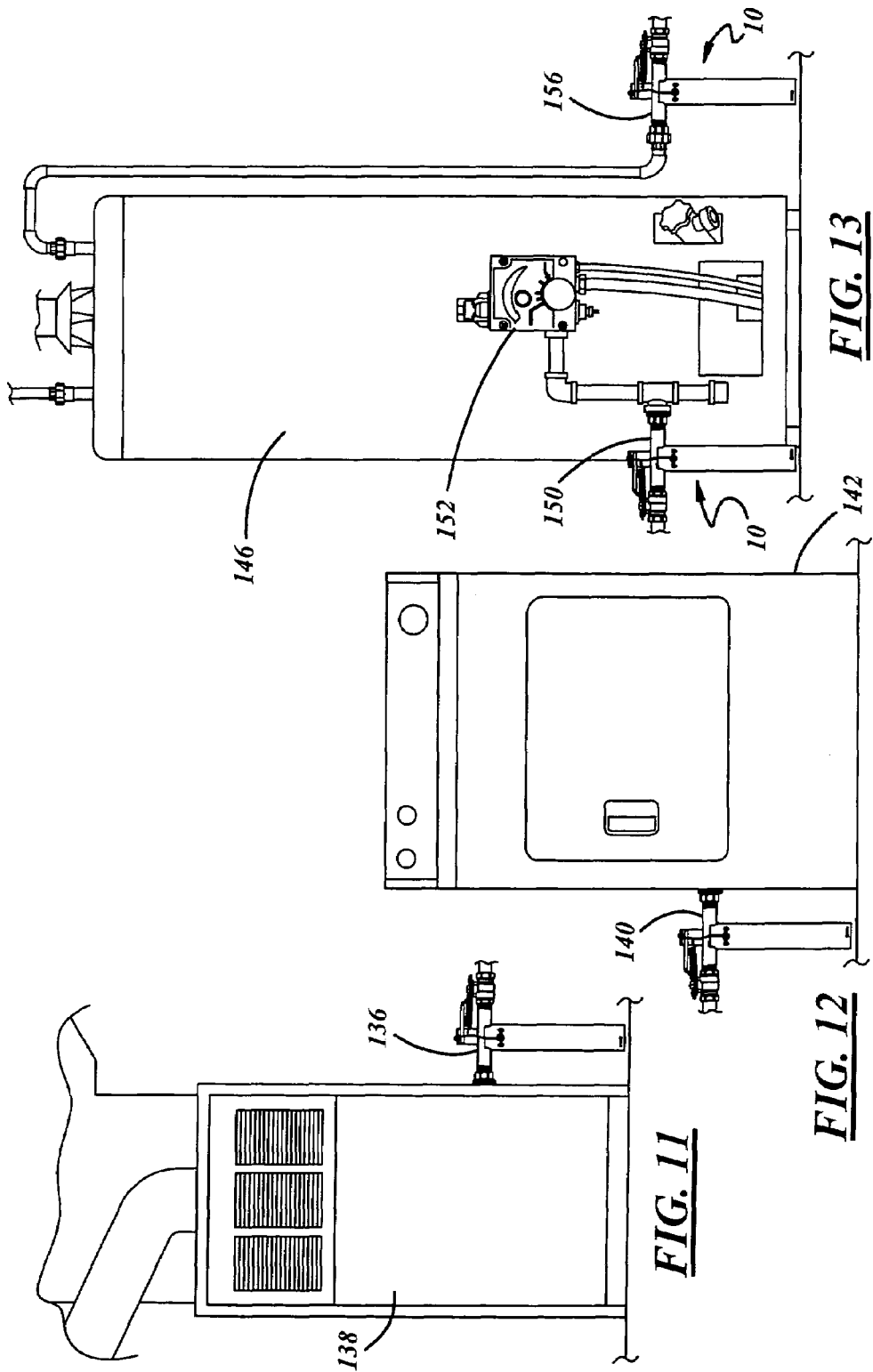

FLOAT CONTROL FLUID SHUT OFF VALVE MECHANISM

TECHNICAL FIELD

The present invention relates to a float control safety valve mechanism for closing fluid supply lines and, more particularly, to a shut off valve mechanism which is located in a gas line on the inlet side of a gas meter, gas dryer, gas furnace, other gas operated appliance or in a water line, as an example, on the inlet side of a hot water tank or heater. In addition, the mechanism may be interposed in any liquid line leading to a vessel or container for holding any liquid. The water or liquid escaping, as an example from a ruptured hot water tank or other vessel, is effective to operate one or more float control valve mechanisms located in the inlet line of the water tank or vessel and in the adjacent gas operated appliance where the escaping water or liquid raise the float mechanisms and closes the water and gas inlet lines.

BACKGROUND OF THE INVENTION

Hot water tanks are typically provided with protective devices for automatically shutting off the supply of gas to the burner when the burner flame is extinguished due to leaking water. However, there may be circumstances when the burner flame is extinguished and the gas continues to escape through the pilot light into the room.

Water heaters or hot water tanks, whether in residential or commercial buildings, are susceptible to failure in a manner when the water within the tank and water entering the tank will leak uncontrollably onto the underlying floor. Such flooding could cause extensive damage to the building and its contents particularly when the flooding occurs on a weekend in a commercial building or when the homeowner is absent from the building or house.

Because the water tank is often placed in a position remote from the water drain, serious damage can result to floors, floor coverings and to goods that are stored proximate to the leaking tank, if the tank is allowed to leak for a prolonged period of time. In addition, it is possible for the pilot light to go out and in certain cases for gas to escape into the house or building. Accordingly, there is a need for a simplified and improved safety fluid shut off valve mechanism which shuts off the water or other fluid supply to the water tank/heater, to a brine tank and to gas operated appliances when an undesirable water leak occurs. Accordingly, it is desirable to have a shut off valve mechanism which is actuated in response to an external stimulus such as, for example, escaping water or liquid from a domestic hot water system or tank or other vessel.

SUMMARY OF THE INVENTION

It is a feature of the present invention to provide a safety cut off mechanism for opening and closing a valve located in an inlet line through which a fluid, either a liquid or gas, can flow when open, the mechanism having valve actuation means for moving the valve from a first open position to a second close position under the influence of a trigger mechanism which is normally cocked to hold the valve in the open position to permit a fluid, either gas or liquid, to flow in the inlet line.

Another feature of the present invention is to provide a mechanism for opening and closing a valve through which a fluid, either a liquid or a gas, can flow when the valve is open, with the mechanism including an elongated pipe threaded at both ends and having a leading end and a trailing end, a valve body threaded to the leading end of the pipe and a float tube arranged perpendicular to the pipe, with an upper end of the float tube attached to the pipe and the lower end of the pipe being open.

Still another feature of the present invention is to provide a mechanism of the aforementioned type wherein a valve is located in the valve body, a rotatable spindle mounted in the valve body and secured to the valve to open or close the valve thereby permitting or preventing a fluid from entering the pipe. A float is located in the float tube and is displaced vertically by an escaping liquid entering the bottom end of the tube.

A further feature of the present invention is to provide a mechanism of the aforementioned type which includes a trigger mechanism including a lever having one end mounted on the spindle, and a spring interconnected to the lever and to the float tube and a retainer mechanism including an upper pivot arm carried by the upper end of the float tube and having a first wire part extending across the top of the float and second wire part forming a loop pivoted on a wire mounting element secured to the exterior of the float tube.

A still further feature of the present invention is to provide a mechanism of the aforementioned type wherein the retainer mechanism also includes a vertical wire element having an upper end hanging from a bracket secured to the float tube, with the vertical wire element being vertically aligned with the loop of the second wire part, said safety cut off mechanism when the valve is open having the trigger mechanism cocked and retained in a cocked position by the vertical wire element of the retainer mechanism engaged within the loop of the second wire part. With such a construction, the retainer mechanism is released by the float as the float rises in the float tube upon the escaping liquid entering the bottom of the tube thereby creating a force on the float which controls and moves the first wire part in a direction to disengage the loop forming the second wire part from the vertical wire element thereby permitting the energy of the spring to rotate the lever and spindle in a direction closing the valve.

The resulting property damage is minimized due to the automatic shut off of the water supply to the water heater and to the gas supply. One advantage of the present invention is that there are no personal safety hazard concerns regarding electrical shock with water contact as this invention requires no electrical power in order to operate. Another important advantage over other devices is that the present invention performs even during a power outage. The invention is constructed of simple materials and hardware that can be found in a typical hardware store. No newly designed or manufactured valve or other major components are required except for the retainer mechanism. Standard, "off the shelf" hardware pipes, fittings, tubes, springs, floats, and valves are used in the construction of the present invention. Thus, minimal capital is required for tooling and production. The retainer mechanism is not commercially available and is manufactured from available wire.

The simplicity of the present invention is clearly an advantage over prior art devices such that a typical homeowner can easily understand, purchase, install and operate the present invention with present gas and water lines leading to gas meters, gas operated appliances and to water tanks or heaters.

BRIEF DESCRIPTION OF THE DRAWINGS

So that the invention may be more readily understood and carried into effect, reference is made to the accompanying drawings which are offered by way of example only and are not to be taken as limiting the invention. The scope of the invention is defined by the appended claims which are intended to embrace equivalent structures.

FIG. 4 is a sectional view through the shut off mechanism in a latched position taken on the line 4-4 of FIG. 2;

FIG. 5 is a sectional view through the ball valve of the shut off mechanism, taken on the line 5-5 of FIG. 4 and illustrating the ball valve open to permit water to flow therethrough;

FIG. 6 is a sectional view through the shut off mechanism, similar to FIG. 4, but illustrating the trigger mechanism in an unlatched position thus closing the valve and preventing the flow of water therethrough;

FIG. 7 is a sectional view through the ball valve of the shut off mechanism, taken on the line 7-7 of FIG. 6 and illustrating the ball valve closed to prevent flow of water therethrough;

FIG. 8 is the top view through the ball valve, partly in section, taken on the line 8-8 of FIG. 7 and illustrating a stop in the ball valve to limit rotation thereof;

FIG. 9 is a perspective view of another embodiment of the present invention illustrating the water heater or tank and the shut off mechanism located within an overflow or water collection pan;

FIG. 10 is a fragmentary view of still another embodiment of the present invention, showing a vertical wall and floor with a gas meter and a shut off valve mechanism incorporated in the gas inlet line leading to the meter;

FIG. 11 is an elevational view of a further embodiment showing the cut off valve mechanism incorporated in the gas inlet line leading to a gas operated furnace;

FIG. 12 is an elevational view of a another embodiment illustrating a gas operated dryer, with the cut off valve mechanism inserted in the gas inlet line leading to the dryer; and FIG. 13 is an elevational view of still another embodiment of a gas operated hot water tank illustrating a pair of shut off mechanisms, one incorporated in the gas inlet line and the other mechanism incorporated in the water inlet line.

DETAILED DESCRIPTION OF THE PREFERRED EMBODIMENT

Figure 1:
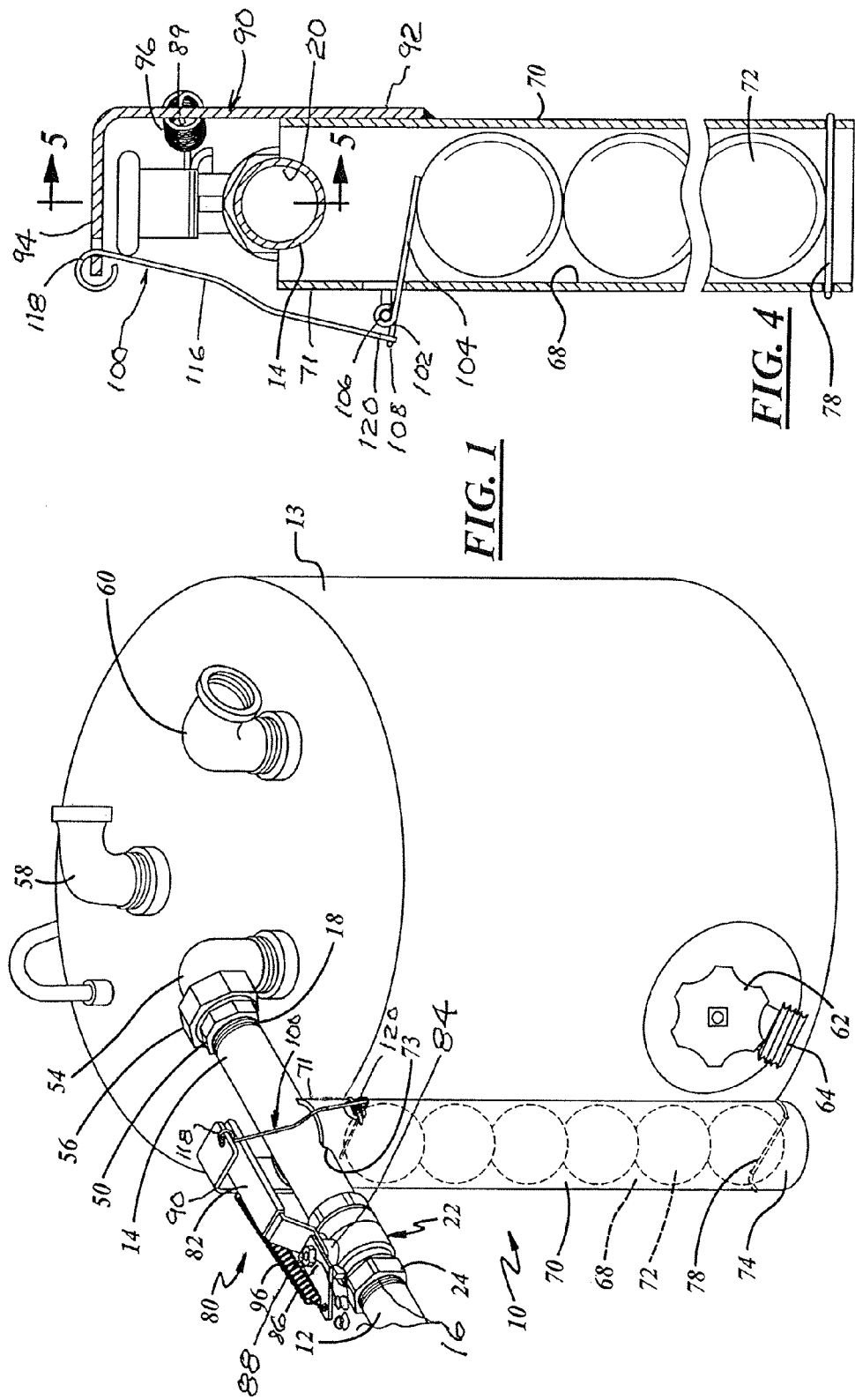
FIG. 1 is a perspective view of a relatively small water heater or tank incorporating the float control fluid shut off device or mechanism of the present invention.

The preferred embodiment of the present invention is illustrated in FIGS. 1-8 inclusive. Other embodiments are illustrated in FIGS. 9-13 inclusive. Common to each embodiment is the use of the float control valve shut off assembly or mechanism 10, as illustrated in FIG. 1. The mechanism 10 is incorporated in the water inlet line 12 leading to a hot water tank 13 of the type that is utilized in kitchens of industrial or commercial buildings to supply hot water to the adjacent dishwasher and to a sink requiring hot water. As will be explained later, the float operated shut off valve mechanism 10 is designed for opening and closing a valve through which a fluid, either a liquid or a gas, can flow when the valve is opened.

The shut off valve mechanism 10 includes a housing having an elongated pipe 14 threaded at the inlet end 16 and at the outlet end 18. The pipe 14 has a straight flow through passage 20 extending between the ends 16, 18 of the pipe 14.

A conventional ball type shut off valve mechanism 22 is threaded to the inlet end 16 of the pipe 14. The ball valve mechanism 22 is best illustrated in FIGS. 5-8 inclusive and includes a valve body 24 internally threaded at the inlet end 26 and at the outlet end 28. The valve body 24 has a straight flow through passage 30 enlarged at the ends and threaded at the inlet and outlet ends 26 and 28, respectively. Located within the flow passage 30 is a ball or closure member valve 32 having a flow through passage 34. The valve body 24 at the center thereof has an enlargement or lug 38 in which is mounted a spindle 40. The lug 38 has a pair of stop abutments 35, 36. The spindle 40 has an upper end 42 and a lower end 44 which is attached to the ball or closure member 32 as illustrated in FIGS. 5 and 7. As will be explained later, the rotation of the spindle 40 is effective to rotate the ball 32 so as to open the ball valve 22 to align the ball passage 34 provided therein with the flow passage 30 provided in the valve body 24. The water inlet line 12 is threadedly connected to the inlet side of the valve 22 as best shown in FIG. 1.

The threaded end 18 of the pipe 14 is provided with a fitting 50 having an externally threaded end 52 to permit the valve mechanism 10 to be connected to the inlet fitting 54 of the hot water tank 14 by a threaded member 56. The hot water tank 14 has other fittings 58 and 60 which permit the tank 14 to be connected to appliances which use hot water such as a dishwasher and a supply line providing hot water to a sink, as an employee. The lower end of the tank 14 has a hand operated valve mechanism 62 which includes a threaded outlet 64 which may be connected to a hose or to another appliance as is well known in the art.

A float passage 68 forms part of the housing of the valve mechanism 10. The float passage 68 is located in a tube 70 having an upper end 71 and a lower end 74 which is open. The lower end 74 of the tube 70 is located relatively close to the floor upon which the hot water tank 13 rests. Tube 70 is arranged generally perpendicular to the flow passage 20 provided in the pipe 14. The tube 70 includes one or more floats 72 such as ping pong balls. The lower end 74 of the float tube 70 is provided with a stop or pin 78 carried by the tube 70 in order to prevent the float(s) 72 from exiting the tube 70.

The upper end 71 of the float tube 70 is cut away to provide a saddle 73, as best illustrated in FIG. 1, for the pipe 14. The pipe 14 is received in the cut away portion or saddle 73 of the tube 70 and is held therein, as an example, by welding.

The valve mechanism 10 includes a trigger mechanism 80. The trigger mechanism 80 has a handle or lever 82 having one end 84 provided with an opening which receives the upper end of the spindle 40. Trigger mechanism 80 also includes a lever extension plate 86 which overlies one end 84 of the lever 82. The plate 86 has an opening for receiving the upper end of the spindle 40. A fastening nut 88 is applied over the upper end of the spindle 40 which is threaded. The nut 88 holds the extension plate 86 and the one end 84 of the lever 82 on the upper surface or seat 89 of the enlargement or lug 38 of the valve body 24.

The housing further includes an L-shaped bracket 90 having the longest end or first leg 92 secured to the upper end of the tube 70, as an example by welding. The other or second leg 94 of the L-shaped bracket 90 extends over and is spaced from the upper end 71 of the tube 70. The first leg 92 of the bracket 90 provides an abutment 89 (FIGS. 2 and 4) for connecting a coil spring 96 to the extension plate 86. The spring 96 may be either a closed helical tension spring or an open helical tension spring.

Figure 2:
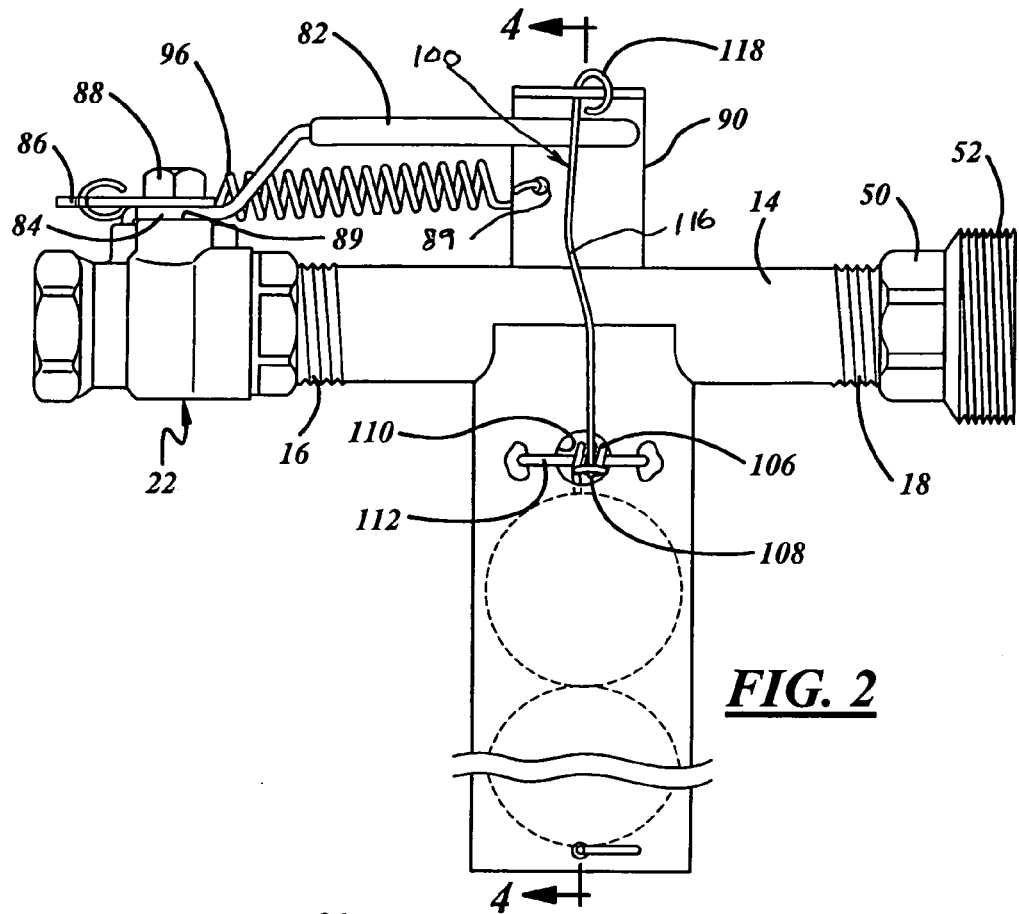
FIG. 2 is an elevational view of the shut off mechanism, with a part broken away and illustrating the trigger mechanism held in a latched position by a retainer mechanism thereby permitting flow of water therethrough.

A retainer or retaining mechanism 100 is provided for holding the trigger mechanism 80 including the lever 82 and the spring 96 in a cocked position, as illustrated in FIGS. 1, 2, and 5 which correspond to the open position of the ball valve 22. The retaining mechanism 100 includes a pivot arm 102 carried by the tube 70 or housing, with a first wire 104 part located in the float passage 68 at the upper end 71 of the tube 70 and a second wire forming a mounting coil 106 and a loop 108 located on the outside of the tube 70. As shown in FIG. 2, the upper end 71 of the housing tube 70 includes an opening 110 through which the second wire and coil 106 of the pivot arm 102 extends. The pivot arm 102 is provided with the spiral end portion or coil 106 which is mounted on a wire or mounting element 112 secured to the outside of the tube 70.

The retaining mechanism or retainer 100 also includes a swingable vertical arm or wire element 116, having upper and lower ends 118, 120. The upper end 118 is provided with a hook which extends through an opening provided in the second leg 94 of the bracket 90 and forms part of the housing. The lower end 120 of the wire element 116 is aligned with and is engageable within the loop 108 of the pivot arm 102. The shut off valve mechanism 10 , when the ball valve 22 is open, permits water to enter the tank 13 through the ball valve 22 and the pipe 14. At such time the trigger mechanism 80 is cocked and is retained in the cocked position by the vertical arm or wire element 116 of the retainer 100 received in the loop 108 as best illustrated in FIGS. 1, 2, 4 and 6.

Figure 3:
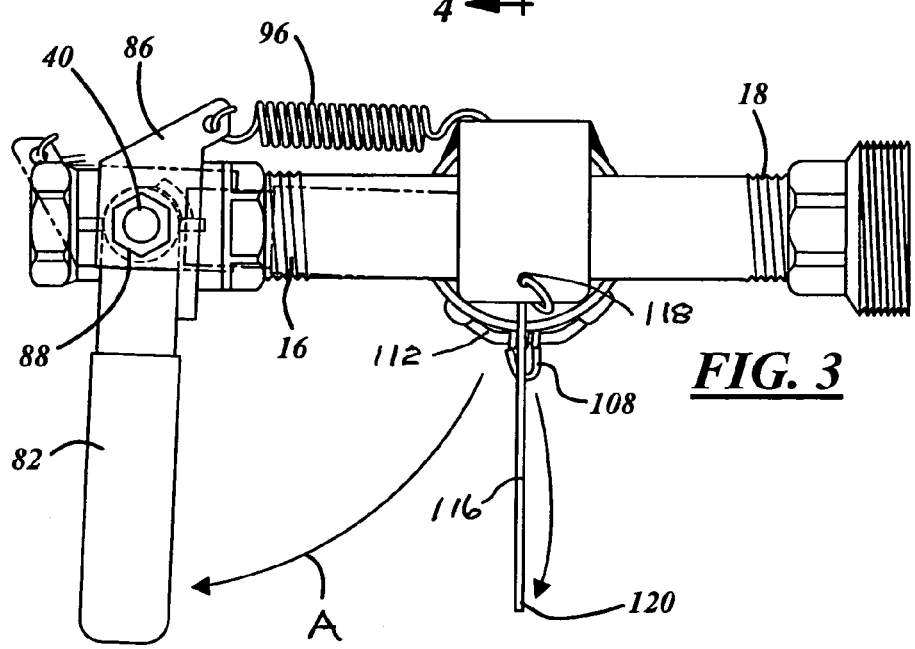
FIG. 3 is a top view of the shut off mechanism with the trigger mechanism in an unlatched position thereby preventing flow of water therethrough.

Upon rupture of the tank 13 or water accumulating on the floor adjacent to tank 13 the water enters the bottom of the tube 70 and urges the float 72 or floats vertically in the float passage 68 of tube 70. As the float or floats 72 rise in the float passage 68, as a result of escaping water entering the lower end of the float passage 68, a force is created on the float or floats 72 which engages and moves the first part of the pivot arm 102 in a direction to lower the loop 108 relative to the pivot arm 102 thereby removing the loop 108 from the lower end 120 of the retainer wire element 116. Such action frees the wire element 116 from the trigger mechanism 80 thus enabling the spring 96 to contract causing the lever arm 82 to rotate as illustrated in FIG. 3 in a direction of arrow A to rotate the spindle 40 and thereby close the valve 22 as illustrated in FIGS. 7 and 8 by preventing water from inlet line 12 from entering the flow passage 20 of the pipe 14.

The second embodiment of FIG. 9 illustrates the hot water tank 13 and the float control fluid shut off valve mechanism 10 located within open top collection pan or tray 130 into which the water from the tank 13, when ruptured, is collected. The tube 70 is spaced slightly from the bottom of the collection tray 130 to permit water to enter the tube 70 and to raise the floats 72 and thereby operate the trigger mechanism 80 as disclosed previously.

FIGS. 10-13 inclusive incorporates the fluid control shut off valve mechanism 10 in a gas line, with the tube 70 in each embodiment spaced from the floor to collect any water on the floor as the result of leakage from a hot water tank, a water storage tank, a washing machine, a drinking fountain or appliances.

In FIG. 10 the valve mechanism 10 is located in the gas supply line 132 leading to the gas meter 134 in the home or building. In FIG. 11 the shut off valve mechanism 10 is located in a gas line 136 leading to a gas furnace 138. In FIG. 12 the shut off valve mechanism 10 is located in the gas line 140 leading to a gas operated dryer 142.

FIG. 13 illustrates a gas operated relatively large hot water tank 146 in which a pair of float operated shut off valve mechanisms 10 are located, with the tank 146 including one mechanism 10 located in the gas line 150 leading to the gas operated pilot light mechanism 152 for heating the water. In addition the second shut off valve mechanism 10 is located in the water line 156 leading from a water source of supply to the tank 146. In the event the tank 146 should rupture, water accumulating on the floor will enter the tubes of the two shut off mechanisms 10 thereby closing the water supply to the tank 146 as well as closing the gas supply line leading to the heater 152 for the tank 146.

The present invention is constructed of simple materials and hardware that can be found in typical hardware stores. The only part of the invention which must be manufactured is the wire retainer or retaining device 100 used to maintain the trigger mechanism 80 in a cocked position. Standard off-the-shelf hardware, valves, floats, pipes, and tubes are used in the construction of the present invention hence minimal initial capital is required for tooling and production. The shut off valve mechanism 10 of the present invention is easily incorporated in a typical office building or house.

Those persons skilled in the art will recognize, or be able to ascertain using no more than routine experimentation, many equivalents to the specific embodiments of the invention described herein. Such equivalents are intended to be encompassed by the following claims.

What I claim is:

1. A float operated shut off valve mechanism for controlling the flow of a fluid, either a liquid or gas, comprising:

a housing including a first part forming an elongated flow passage and a second part forming a float passage;

a valve at one end of said flow passage;

said float passage, having upper and lower ends, arranged perpendicular to said flow passage;

a float in said float passage and displaced vertically by an escaping liquid entering said float passage;

a rotatable spindle mounted in said housing and secured to said valve to open or close said valve thereby permitting the fluid to enter or to prevent the fluid from entering said flow passage;

a trigger mechanism, including a lever, having one end mounted on said spindle; and a spring interconnected to said lever and to said housing;

a retainer for holding said trigger mechanism including said lever and said spring in a cocked position which corresponds to the open position of said valve, said retainer including, a pivot arm carried by said housing, with a first part located in said float passage at the upper end thereof and a second part forming a loop located on the outside of said housing;

said retainer also including a swingable vertical arm, having upper and lower ends, with the upper end thereof supported by said housing, and with the lower end of said swingable arm aligned and engageable within said loop;

said shut off valve mechanism, when the valve is open having said trigger mechanism cocked and retained in said cocked position by the vertical arm of said retainer having the lower end thereof engaged within said loop, said vertical arm being released from said loop by said float as the float rises in said float passage as a result of an escaping fluid entering the lower end of said float passage thereby creating a force on said float which engages and moves said first part of said pivot arm in a direction to release the vertical arm of said retainer from said loop, thus enabling the spring of said trigger mechanism to cause the lever to rotate said spindle in a direction to close said valve and to prevent the fluid, either a gas or a liquid, from entering said flow passage.

2. The float operated shut off valve mechanism as recited in claim 1, wherein said housing includes a pipe threaded at both ends and forming said elongated flow passage; and a tube, open at the upper and lower ends, and forming said float passage; said tube at its upper end being secured to said pipe.

3. The float operated shut off valve mechanism as recited in claim 2, wherein a valve housing is threaded to said one end of said pipe; said valve being located in said valve housing.

4. The float operated shut off valve mechanism as recited in claim 3, wherein said housing include an L-shaped bracket, having a pair of legs, with one leg secured to said tube near the upper end thereof and the other leg being spaced from and overlying said upper end of the tube; said swingable vertical arm being connected to said other leg.

5. The float operated shut off valve mechanism of claim 1, wherein the pivot arm and the swingable vertical arm of said retainer are made from wire.

6. The float operated shut off valve mechanism of claim 2, wherein an externally threaded fitting is threaded to the other end of said pipe.

7. The float operated shut off valve mechanism of claim 1, wherein a stop element is provided at the lower end of said tube to retain said float in tube.

8. The float operated shut off valve mechanism as recited in claim 7, wherein said float consists of one or more spherical elements moveable vertically in said tube as a result of an escaping liquid entering the tube at the lower end thereof.

9. The float operated shut off valve mechanism as recited in claim 1, wherein said trigger mechanism includes a lever extension plate which is mounted on said spindle and overlies a part of said lever, said spring having one end attached to said lever extension plate.

10. The float operated shut off valve mechanism as recited in claim 1, wherein said spring is an open or a closed helical tension spring.

11. The float operated shut off valve mechanism as recited in claim 1 used in a system having a water inlet line and a hot water tank and heater, wherein said valve mechanism is located in said water inlet line leading to said hot water tank and heater, with the lower end of the float tube being located near the floor to receive water escaping from the tank in the event of a rupture to thereby activate the float control fluid shut off valve mechanism.

12. The float operated shut off valve mechanism as recited in claim 1 used in a system having a liquid inlet line and a container, wherein said valve mechanism is located in said liquid inlet line leading to said container for retaining the liquid, with the lower end of the float tube being located near the floor to receive the liquid escaping from said container in the event of a rupture to thereby activate the float control fluid shut off valve mechanism.

13. The float operated shut off valve mechanism as recited in claim 1 used in a system having a gas inlet line and a gas meter or a gas operated appliance, wherein said valve mechanism is located in said gas inlet line leading to a gas meter or to a gas operated appliance, with the lower end of the float tube being located near the floor to receive any liquid escaping from an adjacent tank or container containing a liquid upon rupture thereof to thereby activate the shut off valve mechanism and to close the gas inlet line to prevent gas from reaching the gas meter or appliance.

14. The float operated shut off valve mechanism of claim 1 used in a system having a water inlet line and a hot water tank and heater, wherein said valve mechanism is located in said water inlet line leading to said hot water tank and heater which is located in a pan for containing any water escaping from the tank in the event of a rupture, with the lower end of the tub of said valve mechanism being located in said pan for receiving any water which will activate the valve mechanism.

15. A valve mechanism for opening and closing a valve through which a fluid flows when the valve is open, said mechanism including a flow-through pipe threaded at both ends, a valve housing threaded to one end of said pipe, an elongated tube secured at one end to said pipe, with the other end of said tube being open, float means located within said tube, said valve being located in said valve housing, a spindle mounted in said valve housing and attached to said valve, trigger means for rotating said spindle and moving said valve from a first position when the valve is opened to a second position when the valve is closed, said trigger means including a stationary abutment, a lever mounted on said spindle and a spring interposed between said stationary abutment and said lever, retainer means for holding said lever and said spring in a cocked position corresponding to the open position of said valve, said retainer means including a pivot arm extending through said tube across the other end thereof above said float means, said pivot arm having a loop portion extending outwardly from said tube, said retainer means further including a generally vertical wire element having one end attached to said stationary abutment and having the other end adapted to extend through said loop provided on said pivot arm to retain said lever and said spring of said trigger mechanism in a cocked position corresponding to the open position of said valve, displacement of said float means by a liquid entering said tube at the bottom thereof is effective to provide a force which acts against said pivot arm to rotate same and to thereby release said vertical wire element of said retainer means from said loop thereby permitting said spring and lever to rotate said spindle in a direction to close said valve.

16. The valve mechanism as recited in claim 15, wherein an L-shaped bracket having a pair of legs, with one leg screwed to the upper end of said tube and the other leg being spaced from and overlying said upper end of said tube; said vertical arm element being connected to said other leg.

17. The valve mechanism as recited in claim 16, wherein said trigger mechanism includes a lever extension plate which is mounted on said spindle and overlies a part of said lever, said spring being secured between said other leg of said L-shaped bracket and said lever extension plate.

18. The valve mechanism as recited in claim 17, wherein said spring is an open or a closed helical tension spring.

19. A float operated shut off valve mechanism for controlling the flow of a fluid, either a liquid or gas, comprising:
  a housing including an elongated pipe threaded at both ends;
  a valve body threaded to one end of said pipe; and
  a float tube having an upper end attached to said pipe and a lower end which is open;
  a valve located in said valve body;
  a rotatable spindle mounted in said valve body and secured to said valve to open or close said valve thereby permitting a fluid to enter or preventing the fluid from entering said pipe;
  a float in said float tube which is displaced by an escaping liquid entering the lower end of said tube;
  a trigger mechanism, including a lever, having one end mounted on said spindle; and a spring interconnected to said lever and to said housing;
  a retaining device for holding the trigger mechanism in a cocked position which corresponds to the open position of said valve, said retaining device including, a pivot arm carried by the upper end of said float tube and having a first wire part extending across the top of said float and a second wire part including a loop which extends outwardly through an opening in said tube, said second wire part being pivoted to the exterior of said float tube; and a vertical wire element pivoted on its upper end to said housing above said loop; said shut off valve mechanism, when the valve is open having the trigger mechanism cocked and retained in said cocked position by said vertical wire element having the lower end thereof engaged within said loop, said vertical wire element being released from said loop by said float as the float rises as a result of escaping fluid entering the lower end of the tube thereby creating a force on said float which moves said pivot arm in a direction to release said vertical wire element from said loop thereby permitting the spring to cause said lever to rotate the spindle to close said valve and to prevent the fluid, either a gas or a liquid, from entering said pipe.

20. The float operated shut off valve mechanism as recited in claim 19, wherein said trigger mechanism includes a lever extension plate which is mounted on said spindle and overlies a part of said lever, said spring having one end attached to said lever extension plate.

\* \* \* \* \*